(12) United States Patent
Chang et al.

(10) Patent No.: US 7,480,851 B2
(45) Date of Patent: Jan. 20, 2009

(54) ROBUST ERROR CORRECTION ENCODING/DECODING APPARATUS AND METHOD OF DIGITAL DUAL-STREAM BROADCAST RECEPTION/TRANSMISSION SYSTEM

(75) Inventors: Yong-deok Chang, Suwon (KR); Hae-joo Jeong, Seoul (KR); Sung-woo Park, Suwon (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 471 days.

(21) Appl. No.: 10/965,722

(22) Filed: Oct. 18, 2004

(65) Prior Publication Data

US 2005/0097428 A1    May 5, 2005

Related U.S. Application Data

(60) Provisional application No. 60/516,270, filed on Nov. 3, 2003.

(30) Foreign Application Priority Data

Mar. 2, 2004 (KR) ............... 10-2004-0014054

(51) Int. Cl.
    *H03M 13/00* (2006.01)
    *G06F 11/00* (2006.01)
(52) U.S. Cl. .................... 714/792; 714/800
(58) Field of Classification Search ............ 714/784, 714/756, 704, 786, 792, 800
    See application file for complete search history.

(56) References Cited

U.S. PATENT DOCUMENTS

| | | | |
|---|---|---|---|
| 6,631,492 B2 * | 10/2003 | Marchant | 714/764 |
| 7,111,221 B2 * | 9/2006 | Birru et al. | |
| 7,197,685 B2 * | 3/2007 | Limberg | 714/756 |
| 2002/0191712 A1 | 12/2002 | Gaddam et al. | |
| 2002/0194570 A1 | 12/2002 | Birru et al. | |
| 2003/0099303 A1 | 5/2003 | Birru et al. | |
| 2004/0057535 A1 | 3/2004 | Strolle et al. | |

FOREIGN PATENT DOCUMENTS

KR    1020040108314 A    12/2004

OTHER PUBLICATIONS

International Search Report (International Aplication No. PCT/KR2004/002782) filed on Nov. 1, 2004.

\* cited by examiner

*Primary Examiner*—Shelly A Chase
(74) *Attorney, Agent, or Firm*—Stanzione & Kim, LLP

(57) ABSTRACT

An error correction encoding and/or decoding apparatus and method of a digital dual-stream broadcast transmission and/or reception system. An error correction encoding apparatus includes a TRS encoding part to apply the transversal encoding to normal data packets and robust data packets and to append parity packets to the normal data packet and robust data packet, a randomization unit to randomize the data packets and the parity packets according to a predetermined pattern, an RS encoding unit to append parities to the randomized data packets and parity packets, a packet format unit to split the data packets and the parity packets into normal data and robust data and to process the normal and robust data, and a system control unit to control the packet format unit. Accordingly, a robust error correction encoding apparatus can be provided for the digital dual-stream broadcast transmission system to which Transversal Reed-Solomon (TRS) encoding is applied.

12 Claims, 15 Drawing Sheets

ROBUST ERROR CORRECTION ENCODING/DECODING APPARATUS AND METHOD OF DIGITAL DUAL-STREAM BROADCAST RECEPTION/TRANSMISSION SYSTEM

CROSS-REFERENCE TO RELATED APPLICATIONS

This application is a non-provisional application of prior U.S. provisional Patent Application No. 60/516,270 filed on Nov. 3, 2003. This application claims benefit from Korean Patent Application No. 2004-14054, filed on Mar. 2, 2004, the entire content of which is incorporated herein by reference.

BACKGROUND OF THE INVENTION

1. Field of the Invention

The present general inventive concept relates to an error correction encoding and/or decoding apparatus used with US ATSC standard of digital terrestrial broadcast reception/transmission systems, and more particularly, to a robust error correction encoding and/or decoding apparatus and method of digital dual-stream broadcast reception/transmission systems which split data into normal and robust data for processing, receiving, and transmitting the data.

2. Description of the Related Art

Generally, an error correction apparatus has been used for correcting errors occurring when digital signals are transmitted from an encoder to a decoder. Since an ATSC standard was adopted in a digital signal transmission/reception a system, various types of error correction apparatuses have been proposed. However, the conventional error correction apparatus are not effective to correct errors occurring during transmitting ATSC standard signals.

SUMMARY OF THE INVENTION

In order to solve the above and/or other problems, it is an aspect of the present general inventive concept to provide an error correction encoding and/or decoding apparatus and method of a digital dual-stream broadcast reception and/or transmission system to which a transversal reed Solomon encoding and/or decoding method is applied.

Additional aspects and advantages of the present general inventive concept will be set forth in part in the description which follows and, in part, will be obvious from the description, or may be learned by practice of the general inventive concept.

The foregoing and/or other aspects and advantages of the present general inventive concept may be achieved by providing an error correction encoding apparatus of a digital dual-stream broadcast transmission system comprising a Transversal Reed-Solomon (TRS) encoding part to apply a transversal encoding to normal data packets and robust data packets and to append parity packets, a randomization unit to randomize the data packets and the parity packets according to a predetermined pattern, an RS encoding unit to encode the randomized data packets and parity packets and to append parities of predetermined bytes to the data packets and the parity packets, a packet format unit to split the data packets and the parity packets into normal data and robust data and to process the normal and robust data according to respective data formats, and a system control unit to control the packet format unit to split the data packets and the parity packets into the normal data and the robust data and to process the data packets and the parity packets corresponding to the split normal and robust data.

The foregoing and/or other aspects and advantages of the present general inventive concept may also be achieved by providing an error correction encoding apparatus of a digital dual-stream broadcast transmission system comprising a randomization unit to randomize normal data packets and robust data packets according to a predetermined pattern, a TRS encoding part to apply a transversal encoding to the randomized normal data packets and robust data packets and appending parity packets, an RS encoding unit to append parities of predetermined bytes to the data packets and the parity packets, a packet format unit to split the data packets and the parity packets into normal data and robust data and to process the split normal and robust data according to respective data formats, and a system control unit to control the packet format unit to split into the normal data and the robust data and to process the data packets and the parity packets corresponding to the normal and robust data. The randomization unit can randomize the parity packets in accordance with a predetermined pattern.

The foregoing and/or other aspects and advantages of the present general inventive concept may also be achieved by providing an error correction encoding apparatus of a digital dual-stream broadcast transmission system comprising a randomization unit to randomize normal data packets and robust data packets according to a predetermined pattern, an RS encoding unit to append parities of predetermined bytes to the data packets, a TRS encoding part to apply the transversal encoding to the data packets and appending parity packets, and a packet format unit to split the data packets and the parity packets into normal data and robust data and to process the normal and robust data according to respective data formats, wherein the randomization unit randomizes the parity packets according to the predetermined pattern and the RS encoding unit appends the parity of predetermined bytes to the randomized parity packets.

The foregoing and/or other aspects and advantages of the present general inventive concept may also be achieved by providing an error correction decoding apparatus of digital dual-stream broadcast reception systems comprising a packet re-format unit to split input data packets and parity packets into normal data and robust data and to process the normal and robust data according to respective data formats, an RS decoding unit to correct errors of the packets using parities of predetermined bytes included in the packets, a de-randomization/randomization unit to de-randomize the packets corresponding to error correction encoding and a TRS decoding part to correct errors of the packets using the parity packets, wherein the de-randomization/randomization unit randomizes the packets error-corrected in the TRS decoding part.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
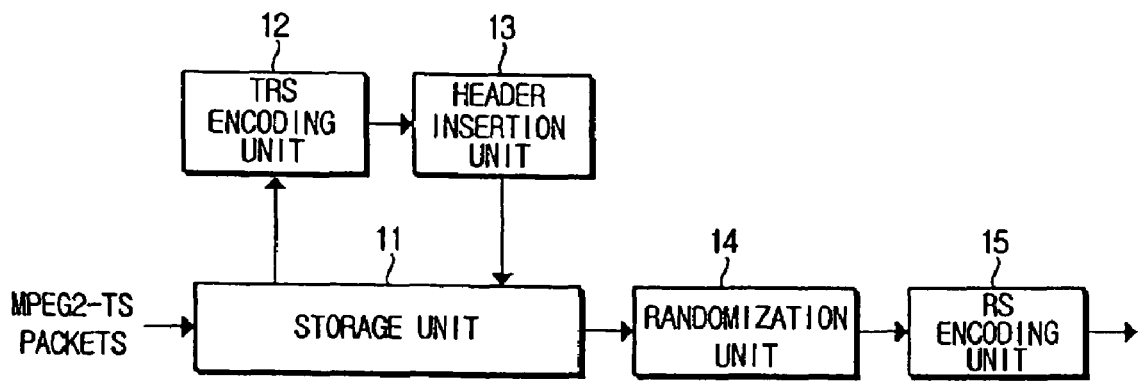
FIG. 1 and FIG. 2 are block diagrams schematically showing an error correction encoding and/or decoding apparatus.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Figure 2:
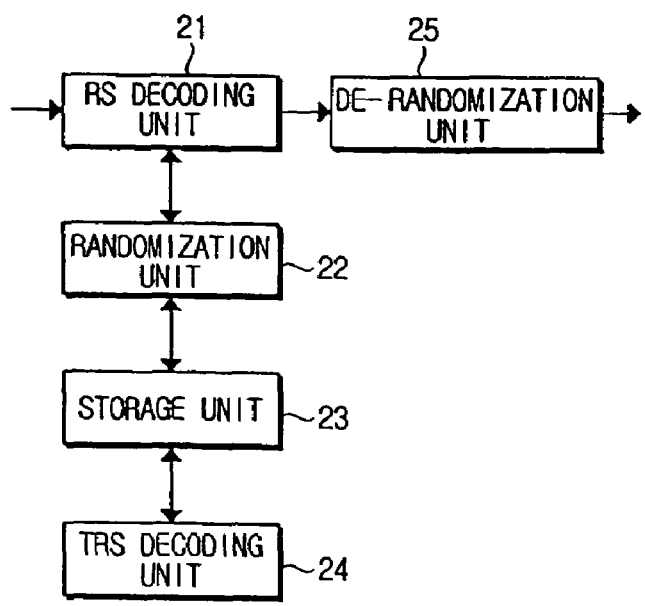

FIG. 1 and FIG. 2 are block diagrams schematically showing a US ATSC standard reception and/or transmission system disclosed in Korean Patent Application No 2003-67522 filed by the Applicants.

In a transmission system as shown in FIG. 1, a Transversal Reed Solomon (TRS) encoding unit 12 produces parity packets in columns with respect to MPEG2-TS packets stored in a storage unit 11, and a header insertion unit 13 inserts parity packet headers (PIDs) for compatibility with existing reception systems. Next, data packets and the parity packets are randomized in a certain pattern by a randomization unit 14, and an RS encoding unit 15 generates and adds 20-byte parities to the data packets and the parity packets.

FIG. 2 is a block diagram schematically showing a reception system corresponding to the reception/transmission system shown in FIG. 1. The reception system may include an RS decoding unit 21, a randomization unit (re-randomization and/or randomization unit) 22, a storage unit 23, a TRS decoding unit 24, and a de-randomization unit 25. The RS decoding unit 21 can correct errors of data packets and parity packets in a row direction using 20-byte parities added to individual packets.

The randomization unit 22 de-randomizes the data packets and the parity packets error-corrected in the row direction by the RS decoding unit 21, and stores the de-randomized data packets and parity packets in the storage unit 23. The TRS decoding unit 24 corrects data packet errors in a column direction using the de-randomized parity packets, and updates the stored data.

Next, the randomization unit 22 randomizes the de-randomized data packets and parity packets, and the RS decoding unit 21 corrects errors in the row direction and the column direction using the parity packets once more, and the de-randomization unit 25 de-randomizes the packets.

As described above, the TRS encoding and decoding system can be applied to the digital dual-stream broadcast receptions and transmissions, the data packets and the parity packets split into normal and robust data are sent together.

Figure 3:
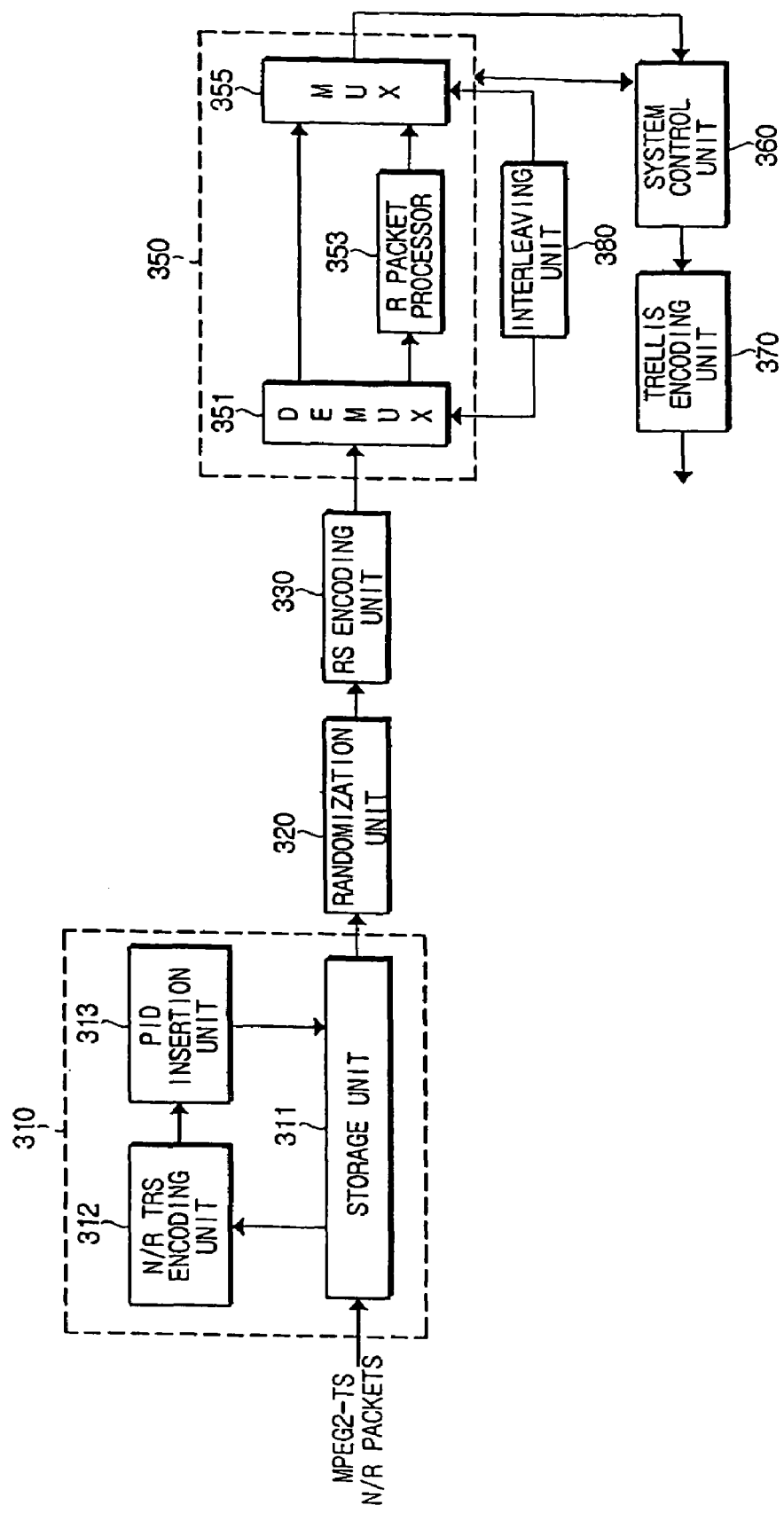
FIG. 3 is a block diagram schematically showing an error correction encoding apparatus used with a digital dual-stream broadcast transmission system according to an embodiment of the present general inventive concept.

FIG. 3 is a block diagram schematically showing an error correction encoding apparatus used with a digital dual-stream broadcast transmission system according to an embodiment of the present general inventive concept. The error correction encoding apparatus as shown in FIG. 3 may include a TRS encoding part 310, a randomization unit 320, a Reed Solomon (RS) encoding unit 330, a packet format part 350, an interleaving unit 380, a Trellis encoding unit 370, and a system control unit 360.

The TRS encoding part 310 may have a storage unit 311, an N/R TRS encoding unit 312, and a PID insertion unit 313, applies transversal encoding to normal data packets and robust data packets to generate parity packets, and inserts packet headers (PIDs) in the generated parity packets.

Figure 4A:
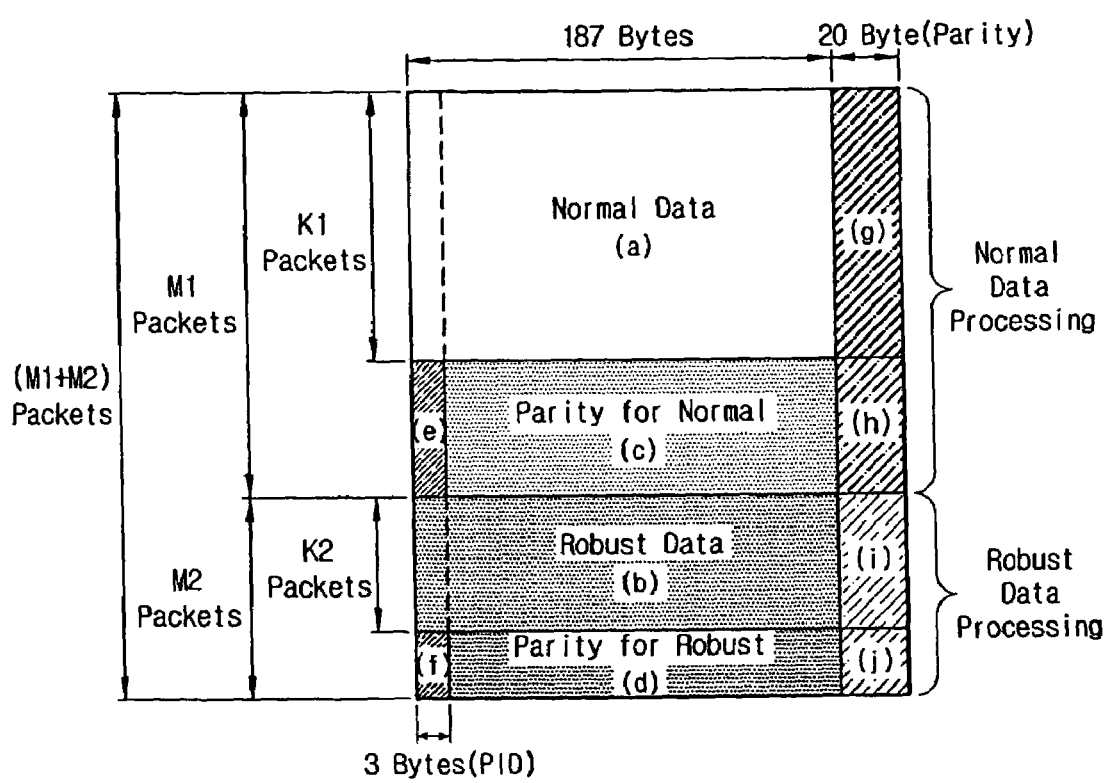
FIG. 4A through FIG. 4C are views showing structures of dual-stream transmission data frames used in the error correction encoding apparatus of FIG. 3.
Figure 4B:
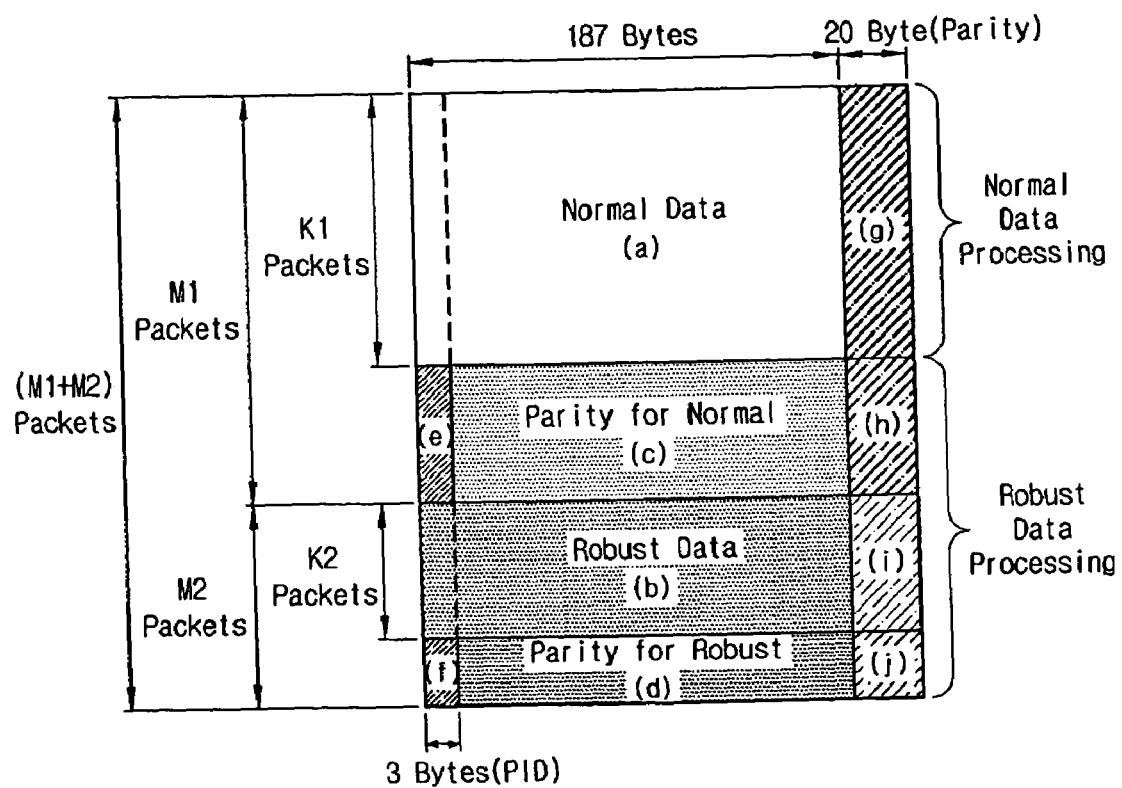
Figure 4C:
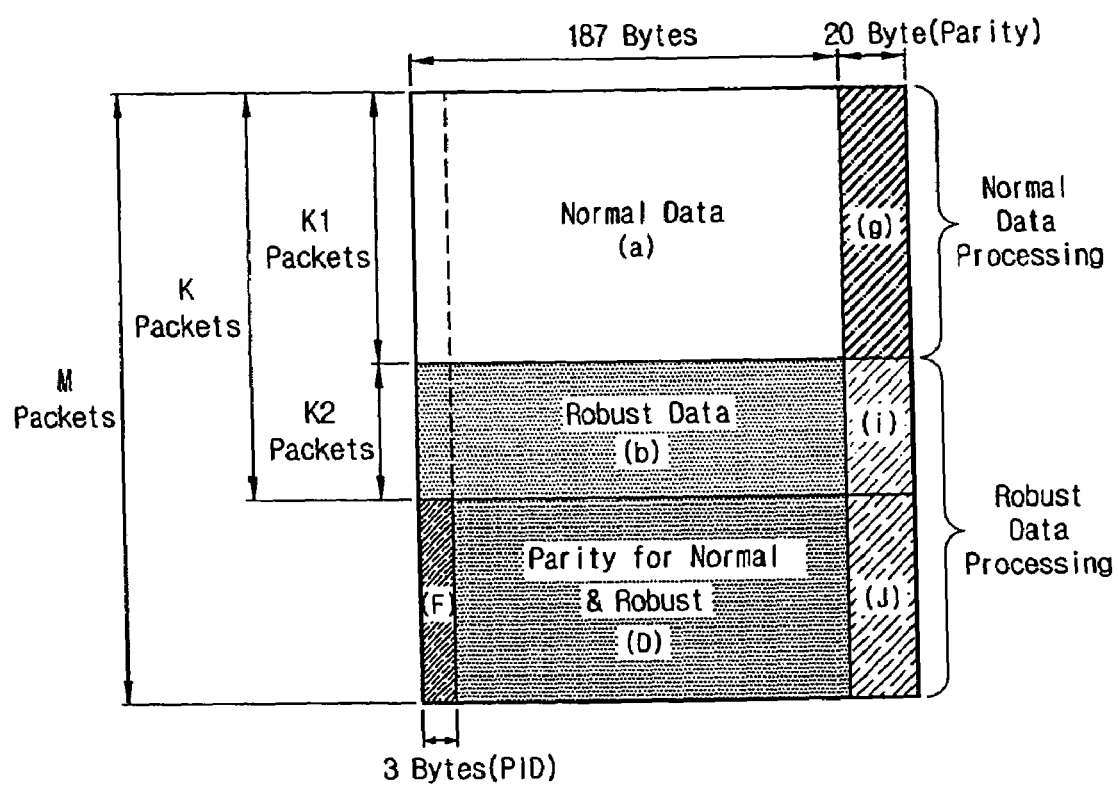

FIGS. 4A to 4C are views showing structures of dual-stream transmission data frames used in the error correction encoding apparatus of FIG. 3. In FIGS. 4A to 4C, the dual-stream transmission data frames can be structured with normal data and robust data.

The TRS encoding part 310 can apply the transversal encoding to data packets (a) and (b) to append the parity packets to data packets (a) and (b), and the parity packets (a) and (b) can be appended in two methods as follows.

In a first method, as shown in FIG. 4A and FIG. 4B, (M2-K2) there is a method of appending normal parity packets (M1-K1) and robust parity packets (M2-K2) to normal data packets K1 and robust data packets (K2), respectively. As shown in FIG. 4C, there is a method of appending parity packets to the entire packets of the normal data packets K1 and the robust data packets K2.

The randomization unit 320 can randomize the data packets and the parity packets in a predetermined pattern. The RS encoding unit 330 can append a parity of bytes to each of the randomized packets.

The packet format part 350 may have a demultiplexer 351, an R packet processor 353, and a multiplexer 355, can split (process) input packets into the normal data and the robust data and can process the normal and robust data corresponding to packet formats under controls of the system control unit 360.

The demultiplexer 351 can split (process) the input packets into the normal data and the robust data as shown in FIGS. 4A through 4C, for example, according to the controls of the system control unit 360. As shown in FIG. 4A, the demultiplexer 351 can split (process) normal data packets and normal parity packets into the normal data, and robust data packets and robust parity packets into the robust data, or, as shown in FIG. 4B, can split (process) the normal data packets into the normal data, and can split (process) normal parity packets, robust data packets, and robust parity packets into the robust data.

Further, as shown in FIG. 4C, the demultiplexer 351 can split (process) the normal data packets into the normal data, and the robust data packets and the normal and robust parity packets into the robust data.

The packets split into the normal data by the demultiplexer 351 can be processed as the normal data according to a normal data processing method, and outputted to the multiplexer 355, and the packets split into the robust data can be processed as the robust data according to a robust data processing method using a certain ratio, for example, ½ or ¼, in the R packet processor 353, and outputted to the multiplexer 355.

The interleaving unit 380 can interleave and re-arrange the processed data packets in bytes according to packet formats. The Trellis encoding unit 370 can apply Trellis encoding to the interleaved data for re-arrangement into bits.

Figure 5:
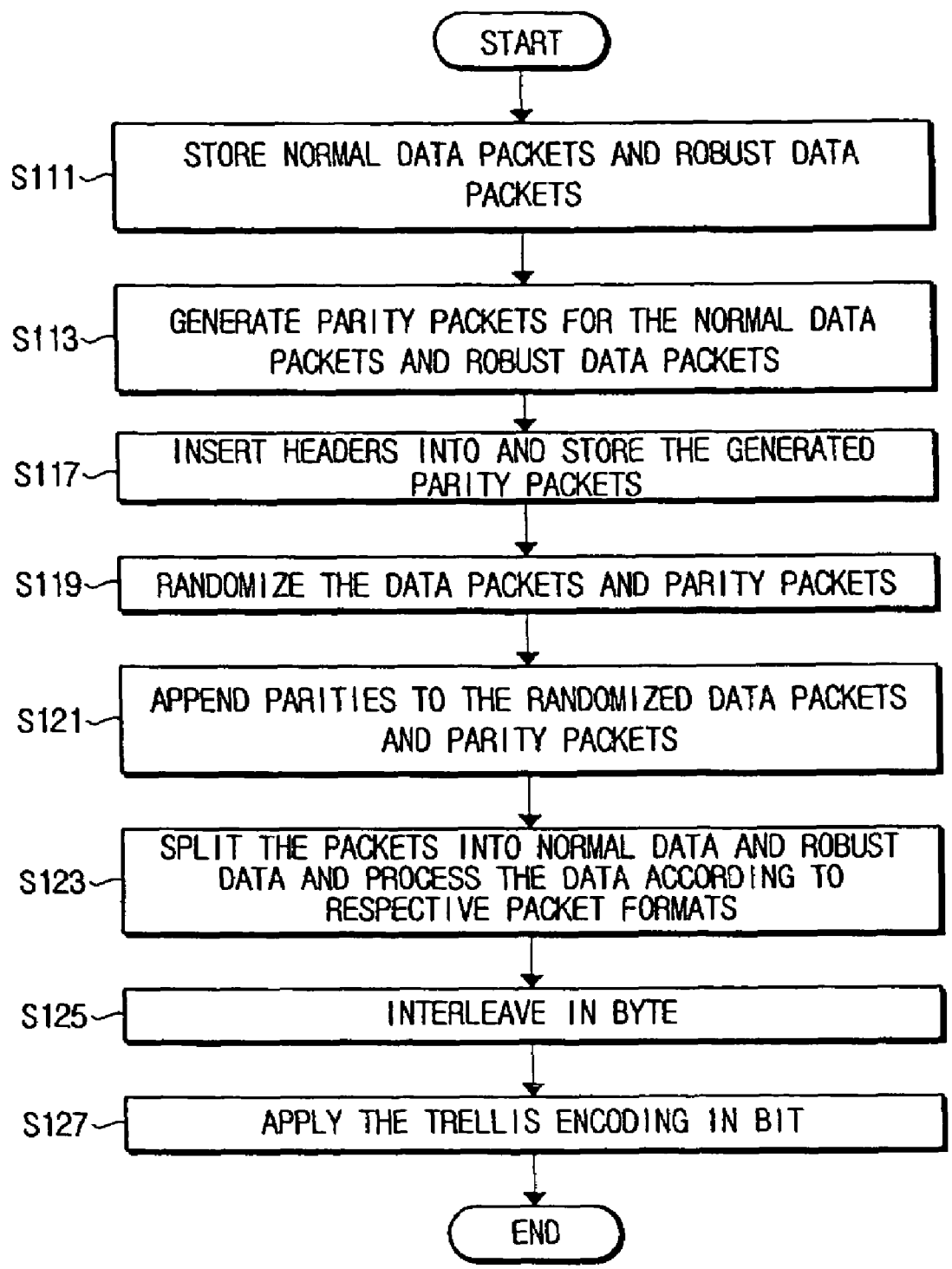
FIG. 5 is a flow chart showing an error correction encoding process of the error correction encoding apparatus of FIG. 3.

FIG. 5 is a flow chart showing an error correction encoding process of the error correction encoding apparatus of FIG. 3. Hereinafter, description will be made in detail on the error correction encoding process of FIG. 5 with reference to FIGS. 4A through 4C.

In an MPEG transmission system (not shown), normal data packets (a) and robust data packets (b) can be stored in the storage unit 311 (S111).

The N/R TRS encoding unit 312 can apply the transversal encoding to the normal data packets (a) and the robust data packets (b) to generate parity packets (S113). As shown in FIG. 4A and FIG. 4B, normal parity packets (c) can be generated with respect to the normal data packets (a), and robust parity packets (d) can be generated with respect to the robust data packets (b). Further, as shown in FIG. 4C, the N/R TRS encoding unit 312 can generate parity packets (D) with respect to the entire packets of the normal data packets (a) and robust data packets (b).

The PID insertion unit 313 can insert packet headers (PIDs) into parity packets (S115). As shown in FIG. 4A and FIG. 4B, headers (PIDs) (e) can be inserted into the normal parity packets (b), and headers (PID) (f) can be inserted into the robust parity packets (b). Further, as shown in FIG. 4C, headers (PIDs) (F) can be inserted into the parity packets (D) generated for the entire packets of the normal data packets (a) and robust data packets (b).

As described above, parity packets can be generated for the normal data packets or the robust data packets, or for the entire data packets, and headers (PIDs) can be inserted into the generated parity packets, and then the parity packets can be stored in the storage unit 311 (S117).

The randomization unit 320 can randomize the data packets and the parity packets stored in the storage unit 311 in a predetermined pattern (S119).

The RS encoding unit 330 can append a parity of predetermined bytes to the randomized packets (S121). As shown in FIG. 4A through FIG. 4C, parities of 20 bytes can be appended.

The packet format part 350 can split input packets into the normal data and the robust data according to the controls of the system control unit 360, and can process the normal and robust data according to the respective data formats (S123).

The interleaving unit 380 can interleave the data packets processed according to the respective data formats (S125), and the Trellis encoding unit 370 can apply the Trellis encoding to the interleaved packets for re-arrangement in bits (S127).

Figure 6:
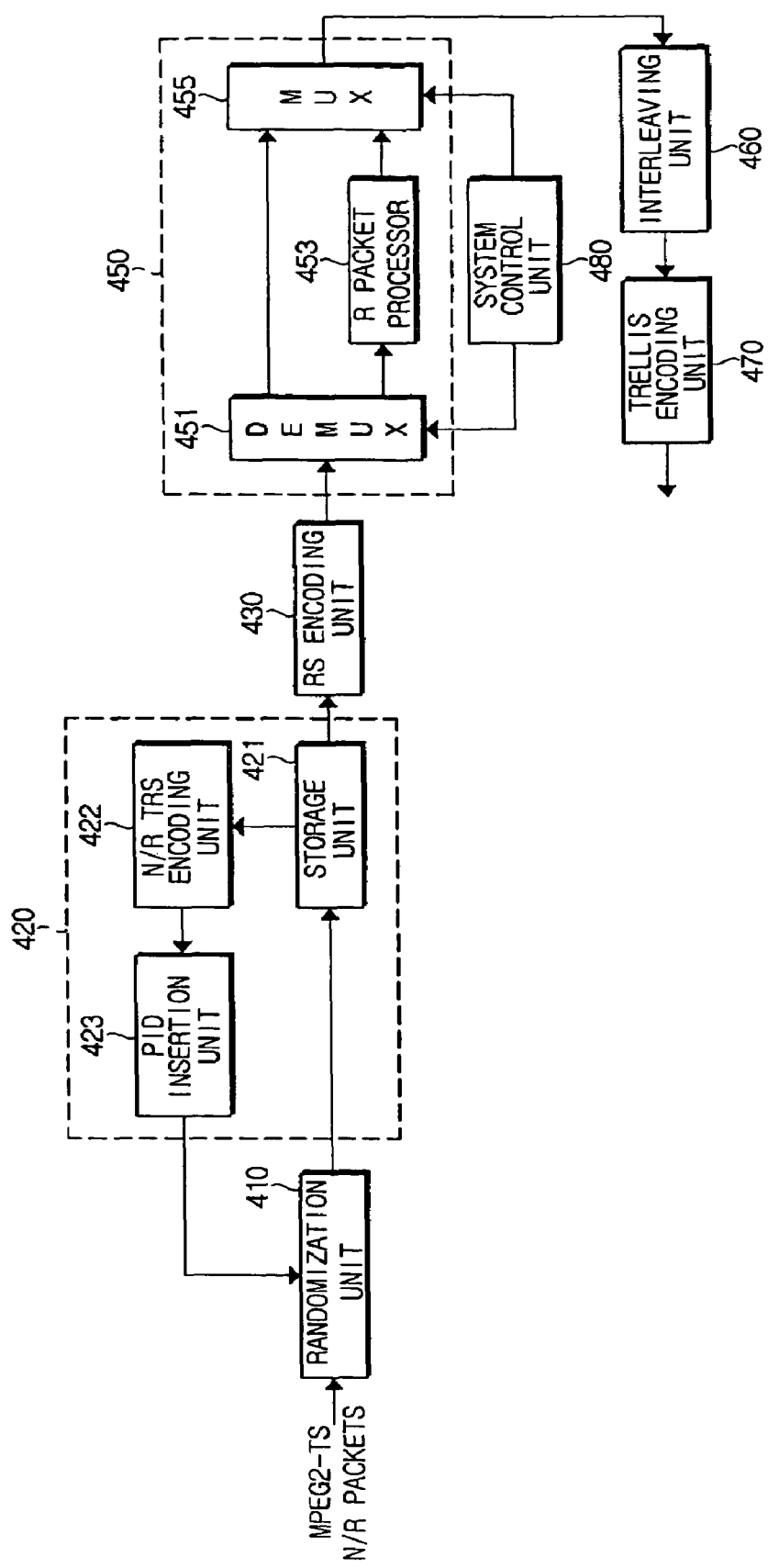
FIG. 6 is a block diagram schematically showing an error correction encoding apparatus used with a digital dual-stream broadcast transmission system according to another embodiment of the present general inventive concept.

FIG. 6 is a block diagram schematically showing an error correction encoding apparatus used with a digital dual-stream broadcast transmission system according to another embodiment of the present general inventive concept. As shown in FIG. 6, the error correction encoding apparatus may have a randomization unit 410, a TRS encoding part 420, an RS encoding unit 430, a packet format part 450, an interleaving unit 460, a Trellis encoding unit 470, and a system control unit 480.

The randomization unit 410 can randomize in a predetermined pattern the normal and robust data packets inputted from an MPEG transmission system (not shown), and parity packets fed back from the TRS encoding part 420 as well.

The TRS encoding part 420 may have a storage unit 421, an N/R TRS encoding unit 422, and a PID insertion unit 423, can apply the transversal encoding to the randomized normal data packets and robust data packets to generate parity packets, and can insert headers (PIDs) into the generated parity packets.

The RS encoding unit 430 can append parities of predetermined bytes to the randomized data and parity packets.

The packet format part 450 may have a demultiplexer 451, an R packet processor 453, and a multiplexer 455, can split individual packets inputted according to the controls of the system control unit 480 into the normal data and the robust data, and can process the split data according to respective data formats. Here, the packets can be diversely split into the normal and robust data as described in FIGS. 4A through 4C.

The interleaving unit 460 can interleave the packets processed according to data formats for re-arrangement in byte. The Trellis encoding unit 470 applies the Trellis encoding to the interleaved data for re-arrangement in bits.

Figure 7:
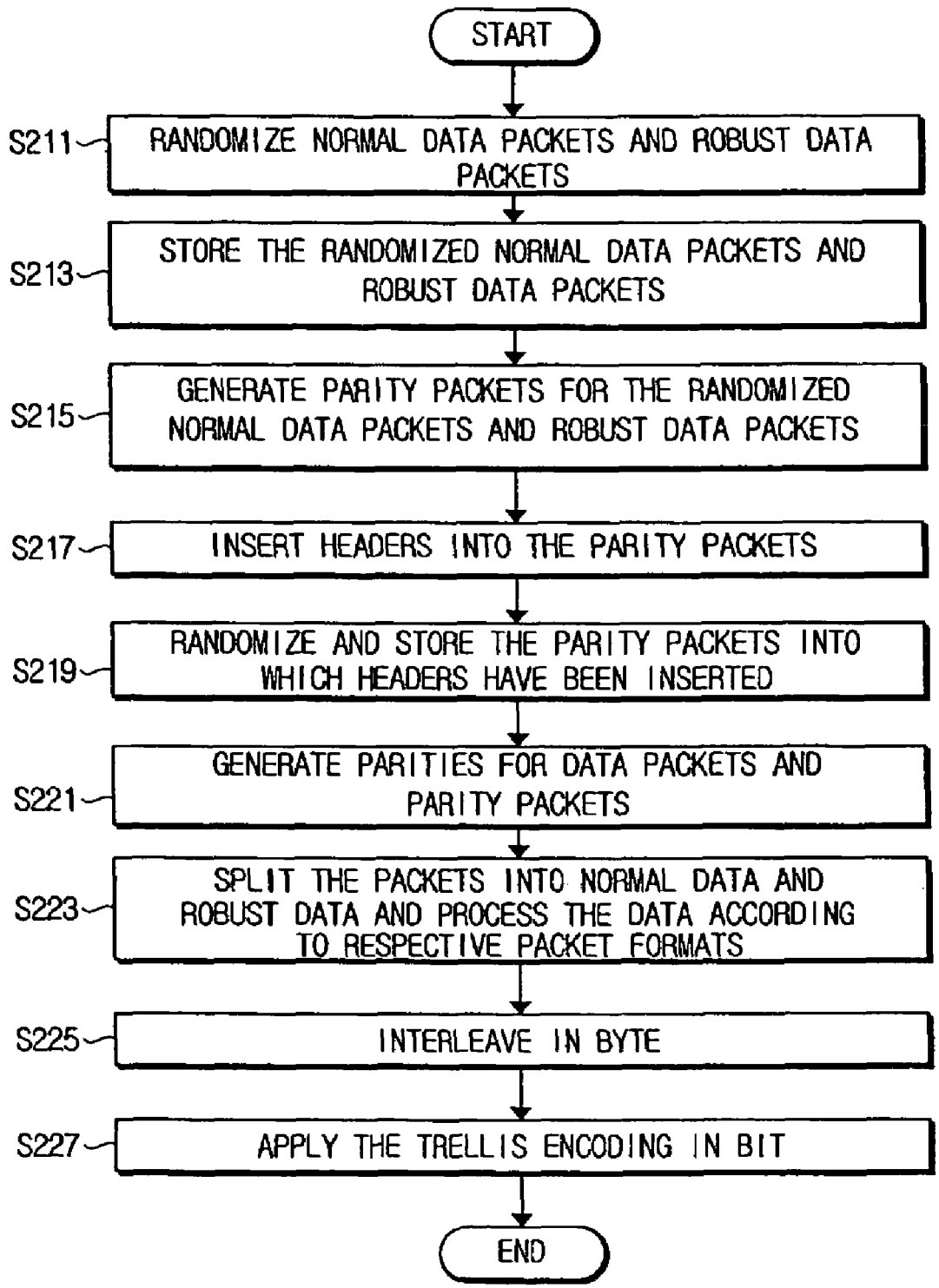
FIG. 7 is a flow chart showing an error correction encoding process of the error correction encoding apparatus of FIG. 6.

FIG. 7 is a flow chart showing an error correction encoding process of the error correction encoding apparatus of FIG. 6. Hereinafter, description will be made in detail on the error correction encoding process of FIG. 7 with reference to FIGS. 4A through 4C.

The normal data packets (a) and the robust data packets (b) can be inputted from the MPEG transmission system (not shown), and the randomization unit 410 can randomize the normal data packets (a) and the robust data packets (b) according to a predetermined pattern (S211).

The randomized normal data packets (a) and robust data packets (b) can be stored in the storage unit 421 (S213).

The N/R TRS encoding unit 422 can apply the transversal encoding to the randomized normal data packets (a) and robust data packets (b) to generate parity packets (S215). As shown in FIG. 4A and FIG. 4B, the N/R TRS encoding unit 422 can generate the normal parity packets (c) with respect to the normal data packets (a), and can also generate the robust parity packets (d) with respect to the robust data packet (b). Further, as shown in FIG. 4C, the N/R TRS encoding unit 422 can generate parity packets (D) with respect to the entire packets including the normal data packets (a) and the robust data packets (b).

The PID insertion unit 423 can insert headers (PIDs) into parity packets (S217). As shown in FIG. 4A, the PID insertion unit 423 can insert the headers (PIDs) (e) into the normal parity packets (b), and the headers (PIDs) (f) into the robust parity packets (b). Further, as shown in FIG. 4C, the PID insertion unit 423 can insert the headers (PIDs) (F) into the parity packets (D) generated for the entire packets including the normal data packets (a) and robust data packets (b).

As described above, the parity packets into which the headers (PIDs) are inserted can be fed back to the randomization unit 410, randomized according to a predetermined pattern, and stored in the storage unit 421 (S219).

The RS encoding unit 430 can append parities of predetermined bytes to the data packets and the parity packets that are stored in the storage unit 421 (S221). As shown in FIGS. 4A through FIG. 4C, the RS encoding unit 430 can append parities of 20 bytes to the respective packets.

The packet format part 450 can split input packets into the normal data and the robust data according to the controls of the system control unit 480, and can process the split data according to respective packet formats (S223).

The interleaving unit 460 can interleave the packets processed according to the data formats for re-arrangement in byte (S225), and the Trellis encoding unit 470 applies the Trellis encoding to the interleaved data for re-arrangement in bit (S227).

Figure 8:
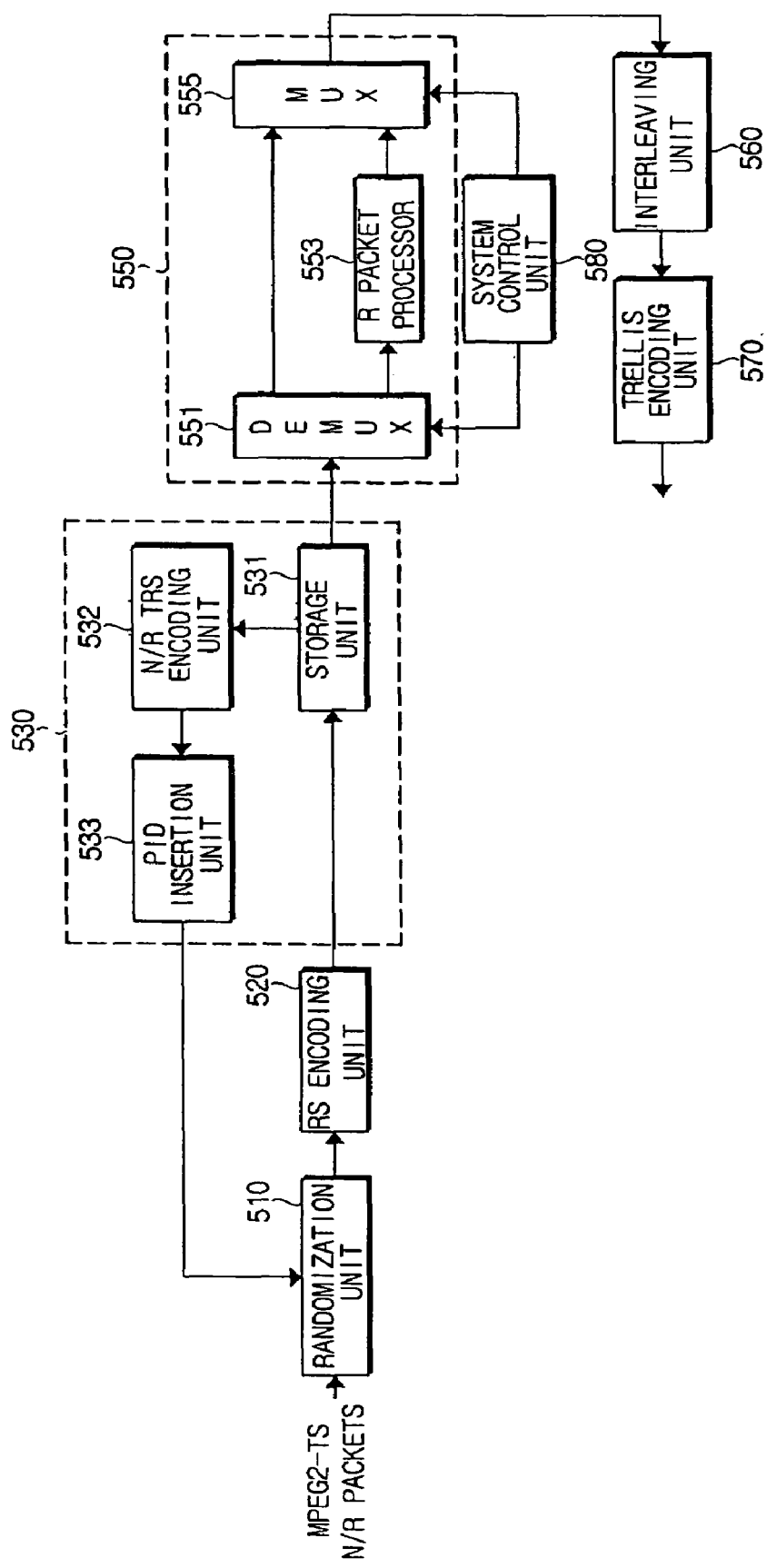
FIG. 8 is a block diagram schematically showing an error correction encoding apparatus used with a digital dual-stream broadcast transmission system according to another embodiment of the present general inventive concept.

FIG. 8 is a block diagram schematically showing an error correction encoding apparatus used with digital dual-stream broadcast transmission systems according to another embodiment of the present general inventive concept. As shown in FIG. 8, the error correction encoding apparatus may have a randomization unit 510, an RS encoding unit 520, a TRS encoding part 530, a packet format part 550, an interleaving unit 560, a Trellis encoding unit 570, and a system control unit 580.

The randomization unit 510 can randomize according to predetermined patterns the normal data packets and the robust data packets that are outputted from the MPEG transmission system (not shown), and can also randomize the parity packets fed back from the TRS encoding part 530.

The RS encoding unit 520 can append parities of predetermined bytes to the randomized normal data packets and robust data packets, and can also append parities of predetermined bytes to the randomized parity packets fed back from the TRS encoding part 530.

The TRS encoding part 530 may have a storage unit 531, an N/R TRS encoding unit 532, and a PID insertion unit 533, can apply the transversal encoding to the parity-appended normal data packets and robust data packets to generate parity packets, and can insert headers (PIDs) into the generated parity packets.

Here, a process of generating the parity packets can generate parity packets for data packets to which parities are appended, and can also generate parity packets for data packets except for parities. In a case of the data packets to which parities are appended, packets can be processed through a re-arrangement process before headers are inserted into the parity packets. That is, if the parity packets are generated with respect to the data packets including the parities, the parity packets may have a size of 207 bytes. Thus, according to 20-byte parities being appended by the RS encoding unit 520, the parity packets can be re-arranged to the size of 187 bytes.

The packet format part 550 may have a demultiplexer 551, an R packet processor 553, and a multiplexer 555, can split input packets transmitted from the TRS encoding part 530 into the normal data and the robust data according to the controls of the system control unit 580, and can process the normal and robust data according to respective data formats. Here, the packets can be diversely split into the normal and robust data as described in FIGS. 4A through 4C.

The interleaving unit 560 can interleave the packets processed according to the packet formats for re-arrangement in byte. The Trellis encoding unit 570 can apply the Trellis encoding to the interleaved data for re-arrangement in bits.

Figure 9:
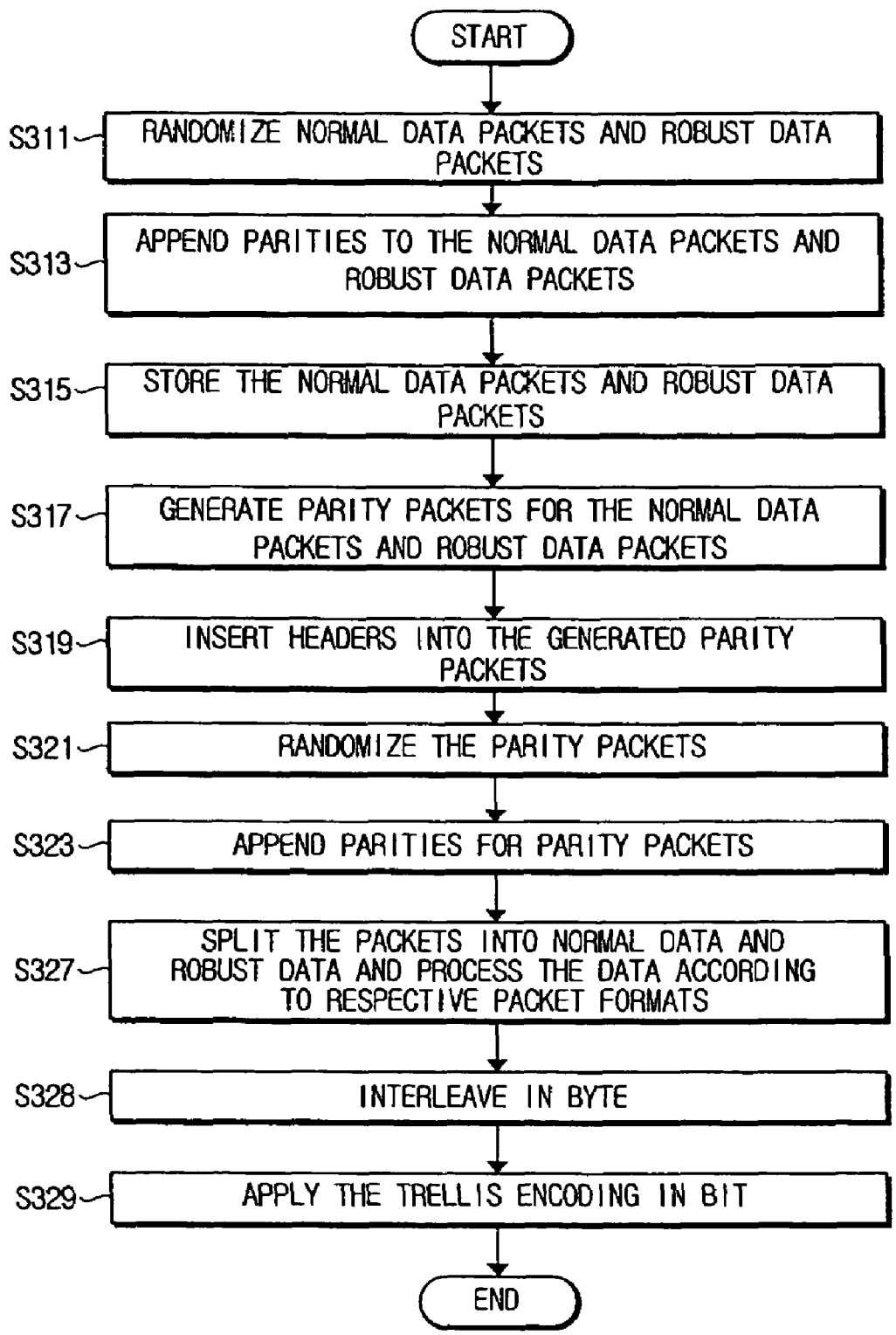
FIG. 9 is a flow chart showing an error correction encoding process of the error correction encoding apparatus of FIG. 8.

FIG. 9 is a flow chart showing an error correction encoding process of the error correction encoding apparatus of FIG. 8. Hereinafter, description will be made in detail on the error correction encoding process with reference to FIG. 4A through FIG. 4C.

The normal data packets (a) and the robust data packets (b) can be inputted from an MPEG transmission system (not shown), and the randomization unit 510 can randomize the normal data packets (a) and the robust data packets (b) according to a predetermined pattern (S311).

The RS encoding unit 520 can append parities of predetermined bytes to the randomized normal data packets (a) and robust data packets (b) (S313).

The storage unit 531 can store the normal data packets (a) and (g) and the robust data packets (b) and (i) to which parities have been appended (S315).

The N/R TRS encoding unit 532 can generate parity packets with respect to the normal data packets (a) and (g) and robust data packets (b) and (i) that have been stored in the storage unit 531 (S317). Here, a process of generating the parity packets can be separated into a process of generating the parity packets with respect to the data packets except for the parities and a process of generating the parity packets with respect to the data packets including the parities.

In a case of the data packets except for the parities, the N/R TRS encoding unit 532 can apply the transversal encoding only to the data portions except for the parities (g) and (i) with respect to the data packets stored in the storage unit 531 in order to generate the parity packets. As shown in FIGS. 4A through 4C, the N/R TRS encoding unit 532 can generate the normal parity packets (c) and the robust parity packets (d) with respect to the normal data packets (a) and the robust data packets (b) or can generate the parity packets (D) with respect to the normal data packets (a) and the robust data packets (b).

In a case of the data packets including the parities, the N/R TRS encoding unit 532 can apply the transversal encoding to the data packets including the parities (g) and (i), and can generate the parity packets (S317). That is, as shown in FIGS. 4A and 4B, the N/R TRS encoding unit 532 can generate the normal parity packet (c) and (h) and robust parity packet (d) and (j) with respect to the normal data packet (a) and (g) and robust data packet (b) and (i), or can generate the parity packets (D) and (J) with respect to the normal data packets (a) and (g) and the robust data packets (d) and (i). Next, the TRS encoding part 530 can re-arrange the generated parity packets in predetermined bytes. For example, the TRS encoding part 530 can re-arrange generated parity packets of 207 bytes into parity packets of 187 bytes.

The PID insertion unit 533 can insert headers (PIDs) into the generated parity packets (S319). As shown in FIG. 4A and FIG. 4B, the PID insertion unit 533 inserts the headers (PIDs) (e) (f) into the generated normal packets (c) and (d), or, as shown in FIG. 4C, the PID insertion unit 533 can insert the headers (PIDs) (F) into the generated parity packets (D).

As described above, the parity packets generated from the TRS encoding part 530 can be fed back to the randomization unit 510 for randomization (S321), and the RS encoding unit 520 can append parities of predetermined bytes to the randomized parity packets (S323). As shown in FIGS. 4A and 4B, the parities (h) and (j) of 20 bytes can be appended to the randomized normal parity packets (c) and robust parity packets (d), or, as shown in FIG. 4C, the parities (J) of 20 bytes can be appended to the randomized parity packets (D).

The parity packets to which the parities of predetermined bytes are appended in the RS encoding unit 520 can be stored in the storage unit 531. That is, the storage unit 531 can store one field data as shown in FIGS. 4A through 4C.

The packet format part 550 can split input packets transmitted from the TRS encoding part 530 into the normal data and the robust data according to the controls of the system control unit 580, and can process the normal and robust data according to respective packet formats (S327).

The interleaving unit 560 can interleave the packets processed according to the data formats for re-arrangement in byte (S328), and the Trellis encoding unit 570 can apply the Trellis encoding to the interleaved data for re-arrangement in bit (S329).

Figure 10:
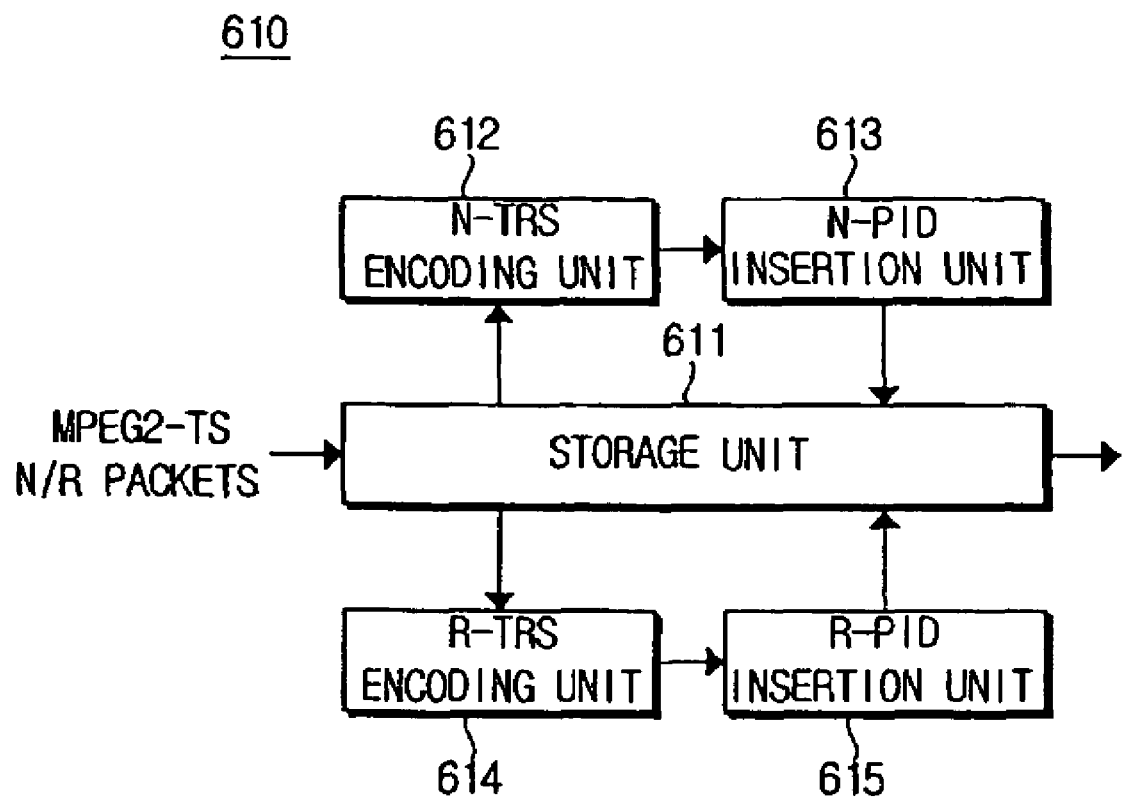
FIG. 10 is a block diagram showing a TRS encoding part of the error correction encoding apparatus shown in FIGS. 3, 6, and 8.

Although the error correction encoding apparatuses of the dual-stream broadcast transmission systems of FIGS. 3, 6, and 8 according to the foregoing aspects of the present general inventive concept have been described to be provided with the TRS encoding unit having a storage unit, an N/R TRS encoding unit, and a PID insertion unit, the error correction encoding apparatuses may have a TRS encoding part 610 as shown in FIG. 10.

As shown in FIG. 10, the TRS encoding part 610 may have a storage unit 611 to store normal data packets and robust data packets, an N-TRS encoding unit 612 to apply the transversal encoding to the normal data packets to generate normal parity packets, an N-PID insertion unit 613 to insert headers (PIDs) into the normal parity packets, an R-TRS encoding unit 614 to apply the transversal encoding to the robust data packets to generate the robust parity packets, and an R-PID insertion unit 615 to insert headers (PIDs) into the robust parity packets.

That is, the TRS encoding parts, shown in FIGS. 3, 5, and 8, can be replaced with the TRS encoding part 610 shown in FIG. 10.

Figure 11:
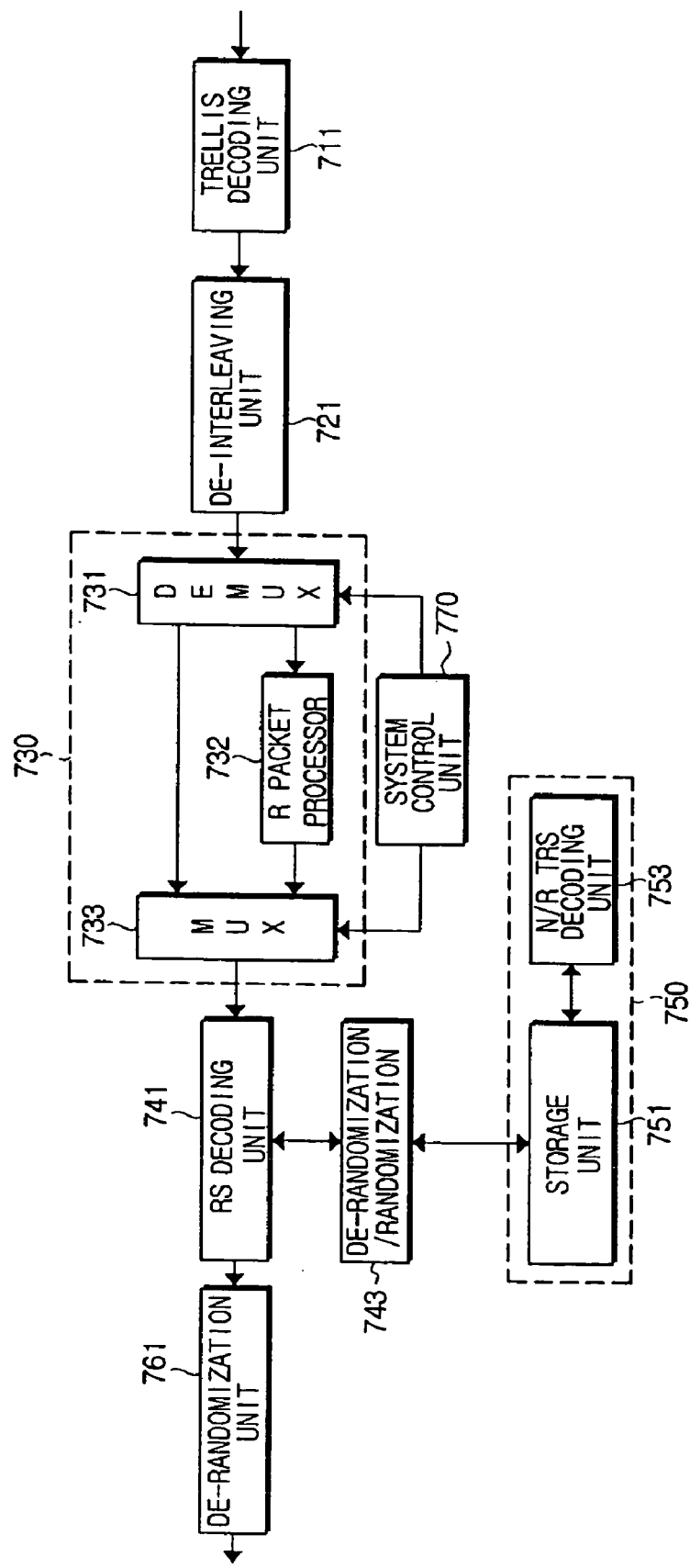
FIG. 11 is a block diagram schematically showing an error correction decoding apparatus used with a digital dual-stream broadcast reception system according to another embodiment of the present general inventive concept.

FIG. 11 is a block diagram schematically showing an error correction decoding apparatus used with a dual-stream broadcast reception system according to another embodiment of the present general inventive concept.

The error correction decoding apparatus may have a Trellis decoding unit 711, a de-interleaving unit 721, a packet re-format part 730, an RS decoding unit 741, a de-randomization/randomization unit 743, a TRS decoding part 750, and a de-randomization unit 761.

The Trellis decoding unit 711 and the de-interleaving unit 721 can apply the Trellis decoding and deinterleaving corresponding to the Trellis encoding and interleaving applied at a transmission system, for example, the transmission system shown in FIGS. 3-10.

The packet re-format part 730 may have a de-multiplexer 731, an R packet processor 732, and a multiplexer 733, can split input packets received from the transmission system through the de-interleaving unit 721 into normal data and robust data according to the controls of the system control unit 770, and can process the normal and robust data corresponding to respective data formats.

The de-multiplexer 731 can split packets in correspondence with formats of the packets split at the transmission system, as shown in FIGS. 4A through 4C, for example, according to the controls of the system control unit 770.

The de-multiplexer 731 can output to the multiplexer 733 the packets that have been split into the normal data, and the R packet processor 732 can process the packets that have been split into the robust data into second normal data according to certain ratios, for example, ½ and ¼, of the transmission system, and outputs the second normal data to the multiplexer 733.

The RS decoding unit 741 can correct errors in a row direction of field data using the parities of predetermined bytes included in the packets.

The de-randomization/randomization unit 743 can randomize packets according to a predetermined pattern. If the TRS encoding unit is used before the randomization unit as shown in FIG. 3, the de-randomization/randomization unit 743 can randomize all the data and parity packets, and, if the TRS encoding unit is used after the randomization unit as shown in FIG. 6, the de-randomization/randomization unit 743 can randomize only the parity packets.

The TRS decoding part 750 may have a storage unit 751 and an N/R TRS decoding unit 753, and can correct packet errors in a column direction using parity packets. The storage unit 751 can store data error-corrected at the RS decoding unit 741 and N/R TRS decoding unit 753, information on whether an error has been corrected, and so on.

The de-randomization unit 761 can de-randomize according to a predetermined pattern the data packets that have been error-corrected in the row direction in the RS decoding unit 741.

Figure 12:
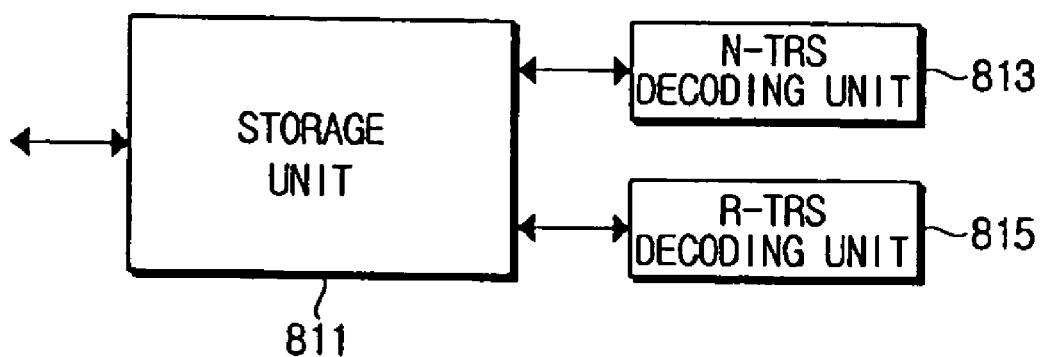
FIG. 12 is a view showing a TRS decoding unit of the error correction decoding apparatus shown in FIG. 11.

In the error correction decoding apparatus used with the dual stream broadcast reception system, the TRS decoding part 750 has been described to include the storage unit 751 and the N/R TRS decoding unit 753, but a TRS decoding part 810 as shown in FIG. 12 can be used as the N/R TRS decoding part 750.

As shown in FIG. 12, the TRS decoding part 810 may have a storage unit 811 to solve data packets and parity packets, an N-TRS decoding unit 813 to apply the transversal decoding to normal data packets using normal parity packets, and an R-TRS decoding unit 815 to apply the transversal decoding to robust data packets using robust parity packets. That is, the TRS decoding part 750 as shown in FIG. 11 can be replaced with the TRS decoding part 810 as shown in FIG. 12.

Figure 13:
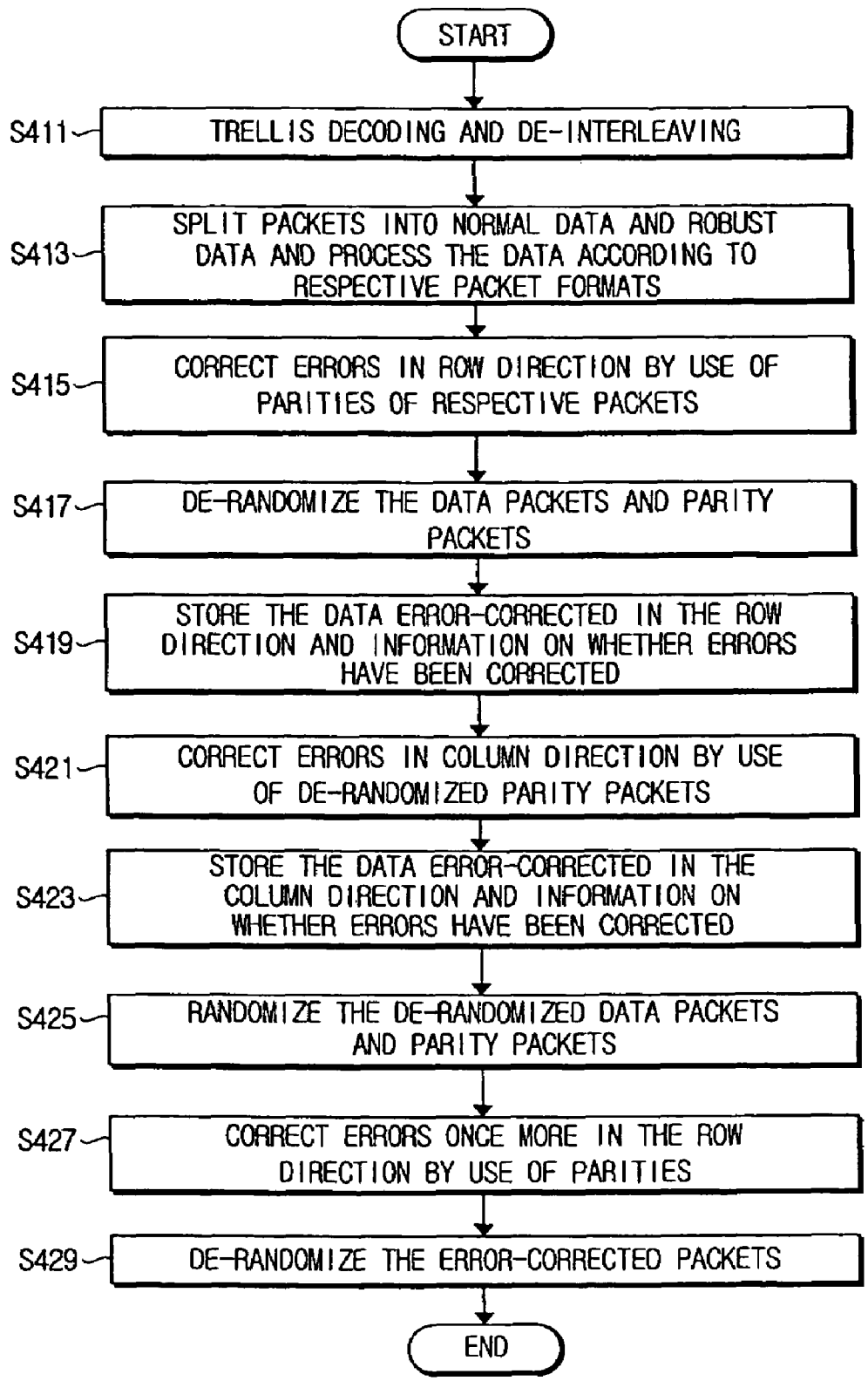
FIG. 13 is a flow chart showing an error correction decoding process of the error correction encoding apparatus of FIG. 3.

FIG. 13 is a flow chart showing an error correction decoding process of the error correction encoding apparatus of FIG. 3.

The Trellis decoding unit 711 and the de-interleaving unit 721 can apply the Trellis encoding used at the transmission system, and can apply the Trellis decoding and de-interleaving corresponding to the interleaving at the transmission system (S411).

The packet re-format part 730 can split the de-interleaved packets into normal data packets and robust data packets, and can process data corresponding to respective packet formats (S413).

The RS decoding unit 741 can use 20-byte parities (g), (h), (i), and (j) included in the packets to correct packet errors in the row direction of the field data (S415).

The de-randomization/randomization unit 743 can de-randomize all the data packets and the parity packets (S417). Here, in the error correction encoding apparatus of FIG. 3, the parity packets generated from the TRS encoding part 310 can be de-randomized packets generated based on the de-randomized data packets since the TRS encoding part 310 is disposed before the randomization unit 320. Therefore, the de-randomization/randomization unit 743 can de-randomize all the data packets and the parity packets.

The storage unit 751 can store data error-corrected in the row direction in the RS decoding unit 743 and information on whether errors have been corrected (S419).

The N/R TRS decoding unit 753 can use the de-randomized parity packets stored in the storage unit 751 to correct errors in the column direction with respect to the de-randomized data packets (S421).

Next, the data stored in the storage unit 751 can be updated based on the data error-corrected in the column direction in the N/R TRS decoding unit 753 and the information on whether the errors have been corrected (S423).

The de-randomization/randomization unit 743 can re-randomize the de-randomized data packets and parity packets stored in the storage unit 751 (S425). Here, the RS encoding unit 330 of the error correction encoding apparatus of FIG. 3 can randomize the data packets and the parity packets before the RS decoding unit 741 applies the RS decoding since parities have been appended to the randomized data packets and parity packets.

The RS decoding unit 741 can use 20-byte parities to correct errors once more with respect to the randomized data packets and parity packets (S427).

The de-randomization unit 761 can de-randomize the error-corrected data according to a predetermined pattern, so the reception system can terminate its error correction (S429).

Figure 14:
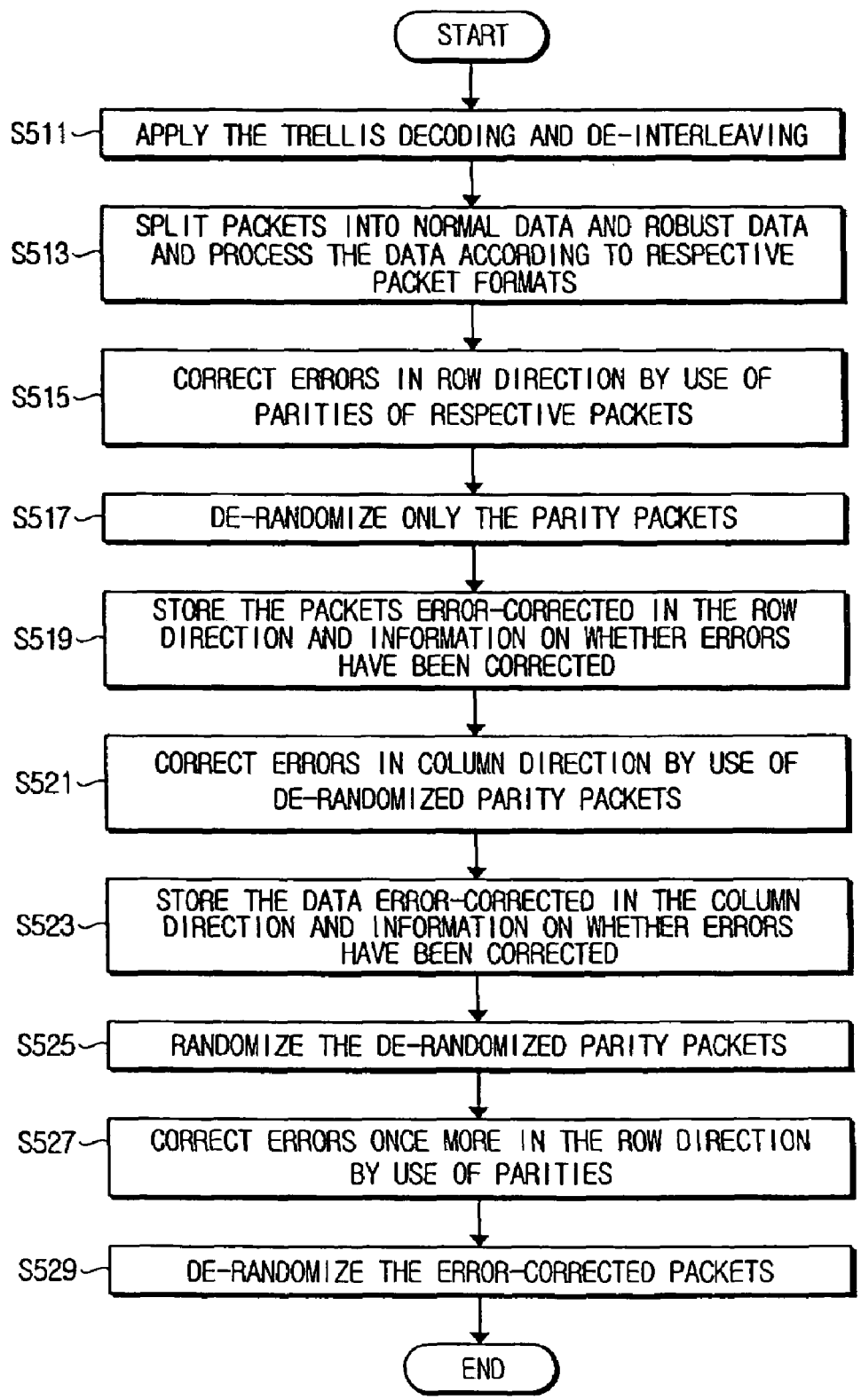
FIG. 14 is a flow chart showing an error correction decoding process of the error correction encoding apparatuses shown in FIGS. 6 and 8.

FIG. 14 is a flow chart showing an error correction decoding processor of the error correction decoding apparatuses shown in FIGS. 6 and 8, and description will be made on the error correction decoding process of FIG. 14 with reference through FIG. 11.

The Trellis decoding unit 711 and the de-interleaving unit 721 can apply the Trellis encoding used at the transmission system, and apply the Trellis decoding and de-interleaving corresponding to the interleaving used at the transmission system (S511).

The packet re-format part 730 can split the de-interleaved packets into normal data packets and robust data packets, and can process the normal and robust data corresponding to respective packet formats (S513).

The RS decoding unit 741 can use 20-byte parities included in the packets to correct packet errors in the row direction of field data (S515).

The de-randomization/randomization unit 743 can de-randomize only the parity packets (S517). Here, the de-randomization/randomization unit 743 can de-randomize only the parity packets since the TRS encoding part of the error correction encoding apparatuses shown in FIGS. 6 and 8 is disposed behind the randomization unit and the parity packets generated from the TRS encoding part can be de-randomized packets generated based on the randomized data packets.

The storage unit 751 can store data error-corrected in the row direction in the RS decoding unit 741 and information on whether errors have been corrected (S519).

The N/R TRS decoding unit 753 can use the de-randomized parity packets stored in the storage unit 751 to correct errors in the column direction with respect to the randomized data packets (S521).

Next, the N/R TRS decoding unit 753 can update the data stored in the storage unit 751 based on the data error-corrected in the column direction and the information on whether the errors have been corrected (S523).

The de-randomization/randomization unit 743 can re-randomize the de-randomized data packets stored in the storage unit 751 (S525). Here, the RS encoding unit of the error correction encoding apparatuses shown in FIGS. 6 and 8, can randomize the de-randomized parity packets stored in the storage unit 751 before the RS decoding unit 741 applies the RS decoding since parities are appended to the randomized data packets and parity packets.

The RS decoding unit 741 can use 20-byte parities to correct errors once more with respect to the randomized data packets and parity packets (S527).

The de-randomization unit 761 can de-randomize the error-corrected data according to a predetermined pattern, so the reception system terminates its error correction (S529).

As aforementioned, the present invention can provide an error correction encoding/decoding apparatus and method of the digital dual-stream broadcast transmission/reception system to which the TRS encoding and decoding are applied.

The digital dual-stream broadcast transmission/reception system according to an aspect of the present general inventive concept can obtain an SNR (signal to noise ratio) gain with respect to normal data and robust data by applying the TRS encoding, and can improve the performance of an equalizer together with the SNR gain by carrying out the robust data process with respect to parity packets of the normal data.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A digital broadcast reception device to receive at least one of an error correction coded normal and robust data from a digital broadcast transmission system comprising an error correction coding unit including a first encoder and a second encoder, a trellis encoder, and an interleaving unit, the at least one of the error correction coded normal and robust data comprising a predetermined number of at least one of normal and robust data packets, using the first encoder, parities being added to one end of each row for the at least one of normal and robust data packets, and parity packets being generated by the second encoder corresponding to the at least one of normal and robust data packets and the parities, and being added to the at least one of normal and robust data packets and the parities column-by-column, the reception device comprising:

a de-multiplexer configured to split input packets received from the transmission system into the at least robust data; and an error correction decoding device configured to correct the received error correction coded at least robust data, the error correction decoding device comprising:

a trellis decoder to trellis decode the at least robust data trellis encoded by the trellis encoder of the transmitter system;

a first decoder configured to decode a predetermined number of the at least robust data packets using the parities of a predetermined number of bytes included in the at least robust data; and a second decoder configured to decode the at least robust data packets decoded in the first decoder using the parity packets.

2. The digital broadcast reception device of claim 1, wherein parity packets are appended to correspond to each of the normal data packet and the robust data packet.

3. The digital broadcast reception device of claim 1, wherein parity packets are appended to correspond to normal data and the robust data packets together.

4. A digital broadcast reception device to receive at least one of error correction coded normal and robust data from a digital broadcast transmission system comprising an error correction coding unit including a first encoder and a second encoder, a trellis encoder, and an interleaving unit, the at least one of error correction coded normal and robust data comprising a predetermined number of The-at least one of normal and robust data packets, parity packets being generated by the first encoder corresponding to the predetermined number of at least one of normal and robust data packets and being added to the at least one of normal and robust data packets column-by-column, parities by the second encoder to be added to one end of each row for the at least one of normal and robust data packets and the parity packets, the reception device comprising:

a de-multiplexer configured to split input packets received from the transmission system into the at least robust data; and an error correction decoding device configured to correct the received error correction coded at least robust data, the error correction decoding device comprising:

a trellis decoder to trellis decode the at least robust data trellis encoded by the trellis encoder in the transmitter system;

a first decoder configured to decode a predetermined number of the at least robust data packets using the parity packets; and a second decoder configured to decode the at least robust data packets decoded in the first decoder using the parities of a predetermined number of bytes included in the at least robust data.

5. The digital broadcast reception device of claim 4, wherein parity packets are appended to correspond to each of the normal data packet and the robust data packet.

6. The digital broadcast reception device of claim 4, wherein parity packets are appended to correspond to normal data and the robust data packets together.

7. A digital broadcast reception device to receive at least one of error correction coded normal and robust data from a digital broadcast transmission system comprising an error correction coding unit including a first encoder and a second encoder, a trellis encoder, and an interleaving unit, the at least one of error correction coded normal and robust data comprising a predetermined number of at least one of normal and robust data packets, using the first encoder, parity packets being added to the at least one of normal and robust data packets column-by-column, and parities being generated by the second encoder corresponding to the at least one of normal and robust data packets and the parity packets, and being added to the at least one of normal and robust data packets and the parity packets row-by-row, the reception device comprising:

a de-multiplexer configured to split input packets received from the transmission system into the at least robust data; and an error correction decoding device configured to correct the received error correction coded at least robust data, the error correction decoding device comprising:

a trellis decoder to trellis decode the at least robust data trellis encoded by the trellis encoder in the transmitter system;

a first decoder configured to decode a predetermined number of the at least robust data packets using the parities of a predetermined number of bytes included in the at least robust data; and a second decoder configured to decode the at least robust data packets decoded in the first decoder using the parity packets.

8. The digital broadcast reception device of claim 7, wherein parity packets are appended to correspond to each of the normal data packet and the robust data packet.

9. The digital broadcast reception device of claim 7, wherein parity packets are appended to correspond to normal data and the robust data packets together.

10. A digital broadcast reception device to receive at least one of error correction coded normal and robust data from a digital broadcast transmission system comprising an error correction coding unit including a first encoder and a second encoder, a trellis encoder, and an interleaving unit, the at least one of error correction coded normal and robust data comprising a predetermined number of at least one of normal and robust data packets, parities being generated by the first encoder corresponding to the predetermined number of the at least one of normal and robust data packets and being added to the at least one of normal and robust data packets row-by-row, parity packets by the second encoder to be added column-by-column to the at least one of normal and robust data packets and the parities, the reception device comprising:

a de-multiplexer configured to split input packets received from the transmission system into the at least robust data; and an error correction decoding device configured to correct the received error correction coded at least robust data, the error correction decoding device comprising:

a trellis decoder to trellis decode the at least robust data trellis encoded by the trellis encoder in the transmitter system;

a first decoder configured to decode a predetermined number of the at least robust data packets using the parity packets; and a second decoder configured to decode the at least robust data packets decoded in the first decoder using the parities of a predetermined number of bytes included in the at least robust data packets.

11. The digital broadcast reception device of claim 10, wherein parity packets are appended to correspond to each of the normal data packet and the robust data packet.

12. The digital broadcast reception device of claim 10, wherein parity packets are appended to correspond to normal data and the robust data packets together.

\* \* \* \* \*